United States Patent [19]

Gephardt

[11] Patent Number: 5,313,597
[45] Date of Patent: May 17, 1994

[54] SYSTEM FOR CONTROLLING COMMUNICATIONS AMONG A COMPUTER PROCESSING UNIT AND A PLURALITY OF PERIPHERAL DEVICES

[75] Inventor: Douglas D. Gephardt, Austin, Tex.

[73] Assignee: Advanced Micro Devices, Inc., Austin, Tex.

[21] Appl. No.: 97,868

[22] Filed: Jul. 27, 1993

Related U.S. Application Data

[63] Continuation of Ser. No. 576,019, Aug. 31, 1990, abandoned.

[51] Int. Cl.$^5$ .................... G06F 13/00; G06F 13/38; G06F 13/36
[52] U.S. Cl. .................................. 395/325; 395/250; 395/275; 364/DIG. 2; 364/239; 364/240; 364/240.5; 364/927.92
[58] Field of Search .................... 364/DIG. 1, DIG. 2

[56] References Cited

U.S. PATENT DOCUMENTS

| | | | |
|---|---|---|---|
| 4,038,644 | 7/1977 | Duke et al. | 395/325 |
| 4,041,472 | 8/1977 | Shah et al. | 395/325 |
| 4,399,503 | 8/1983 | Hawley | 364/200 |
| 4,471,456 | 9/1984 | Branigin et al. | 364/900 |
| 4,527,236 | 7/1985 | Ermolovich | 364/200 |
| 4,688,168 | 8/1987 | Gudaitis et al. | 364/200 |
| 4,901,234 | 2/1990 | Heath et al. | 395/425 |
| 4,908,749 | 3/1990 | Marshall et al. | 364/200 |
| 4,914,584 | 4/1990 | Gibson | 364/200 |
| 4,933,845 | 6/1990 | Hayes | 364/200 |
| 4,975,593 | 12/1990 | Kurakazu et al. | 364/200 |
| 5,003,465 | 3/1991 | Chisholm et al. | 364/200 |
| 5,084,814 | 1/1992 | Vaglica et al. | 395/325 |
| 5,088,025 | 2/1992 | Fujimoto | 364/240 |
| 5,150,467 | 9/1992 | Hayes et al. | 364/DIG. 1 |

FOREIGN PATENT DOCUMENTS

| | | | |
|---|---|---|---|
| 0335502 | 10/1989 | European Pat. Off. | G06F 15/06 |
| 0343770 | 11/1989 | European Pat. Off. | G06F 13/36 |
| 1-42759 | 2/1989 | Japan | G06F 13/20 |

OTHER PUBLICATIONS

"Flexible System Bus Structure with Programmable Transfer Speeds", IBM Technical Disclosure Bulletin, vol. 33, No. 38, pp. 388-390.

Primary Examiner—Gareth D. Shaw
Assistant Examiner—Lucien Toplu
Attorney, Agent, or Firm—Foley & Lardner

[57] ABSTRACT

A system for controlling communications among a computer processing unit and a plurality of peripheral devices which are arrayed in operative connection with a plurality of external buses. The system comprises a bus control circuit for effecting operative routing of address information regarding a respective peripheral device from the computer processing unit to an appropriate external bus, the respective peripheral device being in operative connection with the appropriate external bus. The bus control circuit also effects operative routing of data information from the respective peripheral device to another of the plurality of peripheral devices or to the computer processing unit according to the address information. The system further comprises a plurality of buffers for establishing operative interfaces between the system and each of the plurality of external buses and an internal bus for facilitating communications among the plurality of buffers, the bus control circuit, and the computer processing unit. The bus control circuit enables operative interconnections to the internal bus by the plurality of buffers and the computer processing unit and includes an information storage unit for retaining stored routing information representing all operative interconnections which can operatively occur, the bus control circuit effecting such enabling according to the stored routing information.

6 Claims, 3 Drawing Sheets

5,313,597

SYSTEM FOR CONTROLLING COMMUNICATIONS AMONG A COMPUTER PROCESSING UNIT AND A PLURALITY OF PERIPHERAL DEVICES

This is a continuation of application Ser. No. 07/576,019 filed Aug. 31, 1990 abandoned.

CROSS REFERENCE TO RELATED APPLICATIONS

The following applications contain subject matter similar to the subject matter of this application.

U.S. Pat. application Ser. No. 07/576,012, filed Aug. 31, 1990; entitled "Integrated Digital Processing Apparatus";

U.S. Pat. application Ser. No. 576,601 filed Aug. 31, 1990; entitled "System for Effecting Communications Between a Computing Device and a Plurality of Peripheral Devices";

U.S. Patent application Serial No. 07/576,017 filed Aug. 31, 1990; entitled "Apparatus for Use with a Computing Device Controlling Communications with a Plurality of Peripheral Devices";

U.S. Pat. application Ser. No. 07/576,061, filed Aug. 31, 1990; entitled "Apparatus for Controlling Access to a Data Bus"; and U.S. Pat. application Ser. No. 07/576,695, filed Aug. 31, 1990; entitled "Apparatus for Use with a Computing Device for Generating a Substitute Acknowledgement to an Input when the Computing Device is in an Operational Hiatus".

BACKGROUND OF THE INVENTION

The present invention is a system for controlling communications among a computer processing unit and a plurality of peripheral devices, which peripheral devices are arrayed in operative connection with a plurality of external buses. Specifically, the present invention provides an internal bus routing controller that generates buffer control signals in order to correctly route all possible transfers between the plurality of buses and the computer processing unit on the internal bus provided.

Prior art designs generally have used variations of a bus-central array for a plurality of external buses. Such a bus-central configuration requires that all transfers cross a central bus, with transceivers operatively attached to the central bus for operative connection of other buses to the computer processing unit through the central bus.

There are significant shortcomings associated with such a bus-central design. Principal among the shortcomings is the unsuitability of such a bus-central design for single-chip integration of a computer processing system such as is contemplated by the present invention.

Further, a bus-central design involves increased board trace lengths for all buses because all buses require additional bus runs to be routed to the central bus. Such additional bus runs, in addition to occupying board space ("real estate", in industry parlance) and thereby mitigating against miniaturization of a computer processing system, also provide a greater susceptibility to noise and a greater propensity for electromagnetic signal generation.

Still further, employment of a bus-central design inherently includes in every bus in the bus array the capacitance presented by the central bus. This relatively large capacitance has the detrimental effect of slowing down signal propagation throughout the entire bus array, thereby mitigating against high-speed operation by any peripheral or other component associated with the bus array.

SUMMARY OF THE INVENTION

The invention is a system for controlling communications among a computer processing unit and a plurality of peripheral devices which are arrayed in operative connection with a plurality of external buses. The system comprises a bus control circuit for effecting operative routing of address information regarding a respective peripheral device from the computer processing unit to an appropriate external bus, the respective peripheral device being in operative connection with the appropriate external bus. The bus control circuit also effects operative routing of data information from the respective peripheral device to another of the plurality of peripheral devices or to the computer processing unit according to the address information. The system further comprises a plurality of buffers for establishing operative interfaces between the system and each of the plurality of external buses and an internal bus for facilitating communications among the plurality of buffers, the bus control circuit, and the computer processing unit. The bus control circuit enables operative interconnections to the internal bus by the plurality of buffers and the computer processing unit and includes an information storage unit for retaining stored routing information representing all operative interconnections which can operatively occur, the bus control circuit effecting such enabling according to the stored routing information.

It is, therefore, an object of the present invention to provide a system for controlling communications among a computer processing unit and a plurality of peripheral devices, which reduces board occupancy requirements for data bus interconnection among the peripheral devices and the computer processing unit.

A further object of the present invention is to provide a system for controlling communications among a computer processing unit and a plurality of peripheral devices which is less susceptible to electromagnetic noise and less prone to generating electromagnetic signals than prior art systems.

Still a further object of the present invention is to provide a system for controlling communications among a computer processing unit and a plurality of peripheral devices which is capable of higher speed operation than prior art devices.

Yet a further object of the present invention is to provide a system for controlling communications among a computer processing unit and a plurality of peripheral devices which facilitates segregation of data buses, thereby enabling separate treatment of higher speed devices and lower speed devices.

A still further object of the present invention is to provide a system for controlling communications among a computer processing unit and a plurality of peripheral devices which provides for on-board storage of routing information representing all operative interconnections possible by the apparatus.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
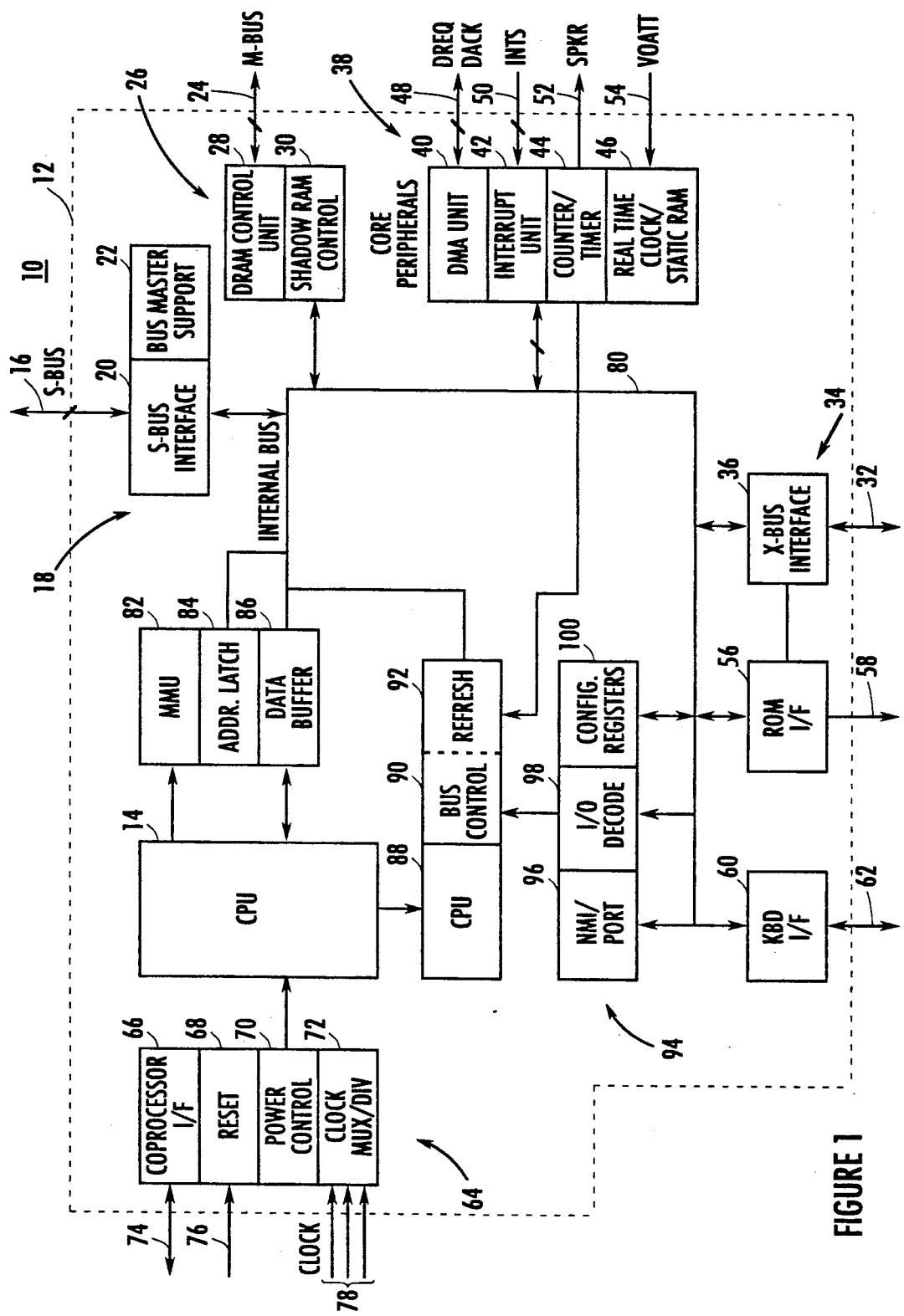
FIG. 1 is a system-level schematic diagram of a computer processing system employing the present invention.

FIG. 1 is a system-level schematic diagram of a computer processing system employing the present invention. In FIG. 1, a system 10 is illustrated as situated on a single substrate 12. System 10 includes a computer processing unit 14, a connection 16 for an S-bus (not shown) and supportive peripheral devices 18 comprising an S-bus interface circuit 20 and a bus master support circuit 22. S-bus supportive peripheral devices 18 are preferably configured to accommodate direct connection of an S-bus to system 10 with no additional peripheral devices required for an effective operative connection.

Similarly, a connection 24 for an M-bus (not shown) has associated therewith M-bus supportive peripheral devices 26, including a dynamic random access memory (DRAM) control unit 28 and a shadow random access memory (RAM) control unit 30. Preferably, M-bus supportive peripheral devices 26 are configured to allow direct connection of the M-bus to M-bus connection 24 with no additional supportive peripheral devices required for an effective operative connection.

A connection 32 with an X-bus (not shown) is also provided for system 10. Associated with X-bus connection 32 are X-bus supportive peripheral devices 34, including an X-bus interface 36. X-bus supportive peripheral devices 34 are preferably configured to allow direct connection of the X-bus to X-bus connection 32 with no additional peripheral devices required for an effective operative connection.

In the environment in which it is anticipated the preferred embodiment of the present invention would be employed, i.e., an AT-configured computing system, the S-bus is intended for use as a system-expansion bus to which would be connected industry-standard signal generators, timing devices, and other expansion cards and subsystems. Similarly, in such a preferred AT system configuration, the M-bus is used for communication to direct DRAM interfaces, while the X-bus is employed as an expansion bus to effect connection with such devices as read-only memories (ROMs), keyboard controllers, numeric co-processors, and the like.

System 10 further comprises a plurality of core peripheral devices 38 which include, by way of example, a direct memory access (DMA) unit 40, an interrupt unit 42, a counter/timer device 44, and a real time clock and static RAM device 46. The various core peripheral devices 38 are operatively connected to input-output pins in order to perform their intended function. Thus, DMA unit 40 is operatively connected with input-output pins 48 in order to receive data request signals (DREQ) and transmit data acknowledgement signals (DACK), interrupt unit 42 is operatively connected with input-output pins 50 in order to receive interrupt signals (Ints), counter/timer device 44 is operatively connected with input-output pins 52 to provide operative connection with a system speaker (Spkr), and real time clock and static RAM device 46 is operatively connected to input-output pins 54 in order to receive power from a power supply, such as VBatt.

While ROMs and keyboard controllers are connectable to system 10 X-bus connection 32, the preferred embodiment of system 10 illustrated in FIG. 1 also provides for direct ROM connection to a ROM interface 56 through an input-output pins 58. Similarly, a keyboard interface 60 is also provided for access to system 10 via input-output pins 62.

Also illustrated in the system-level diagram of FIG. 1 are additional supportive peripheral devices 64, including a co-processor interface 66, a reset circuit 68, a power control circuit 70, and a clock multiplexer and divider unit 72. Input-output pins are provided for access to the various additional supportive peripheral devices 64 so that co-processor interface 66 is connected with input-output pins 74, reset circuit 68 is connected with input-output pins 76, and clock multiplexer divider unit 72 is connected with a plurality of input-output pins 78.

An internal bus 80 is provided to effect communications among the various components of system 10, including S-bus supportive peripheral devices 18, M-bus supportive peripheral devices 26, X-bus supportive peripheral devices 34, core peripheral devices 38, and computer processing unit 14. Computer processing unit (CPU) 14 is operatively connected with internal bus 80 via memory management unit (MMU) 82 and its associated address latch 84 and data buffer 86.

Computer processing unit 14 is responsive to a CPU control device 88, which CPU control device 88 is in intimate communicational relation with a bus control device 90. Bus control device 90 is operatively connected with internal bus 80 and includes a refresh generator 92 which is responsive to counter/timer 44 to periodically refresh specified components of system 10, such as dynamic RAMs (DRAMs) through DRAM control unit 28.

Internal supportive peripheral devices 94 are situated intermediate internal bus 80 and bus control circuit 90, including a non-maskable interrupt (NMI) control port 96, an input-output decode circuit 98, and configurable registers 100.

Thus, system 10 provides appropriate bus-accommodating means such as S-bus supportive peripheral devices 18, M-bus supportive peripheral devices 26, and X-bus supportive peripheral devices 34, as well as ROM interface 56 and keyboard interface 60, to support direct connection of peripheral devices via data buses to system 10 with no additional supportive peripheral devices required. Effective and efficient internal communications within system 10 are provided by internal bus 80, access to which is controlled by bus control circuit 90 so that computer processing unit 14 may provide information to or receive information from any of the several supportive external buses via internal bus 80. Further, information may be exchanged among the various external buses according to bus control circuit 90, as dictated by the program driving computer processing unit 14, all via internal bus 80.

In its preferred embodiment, system 10 is configured on a single substrate 12 as an integrated digital circuit, thereby providing the advantages of higher operating speed, lower power consumption, and reduced occupancy of "real estate" in its physical embodiment.

In order to facilitate understanding of the present invention, like elements will be indicated by like reference numerals in the various drawings.

Figure 2:
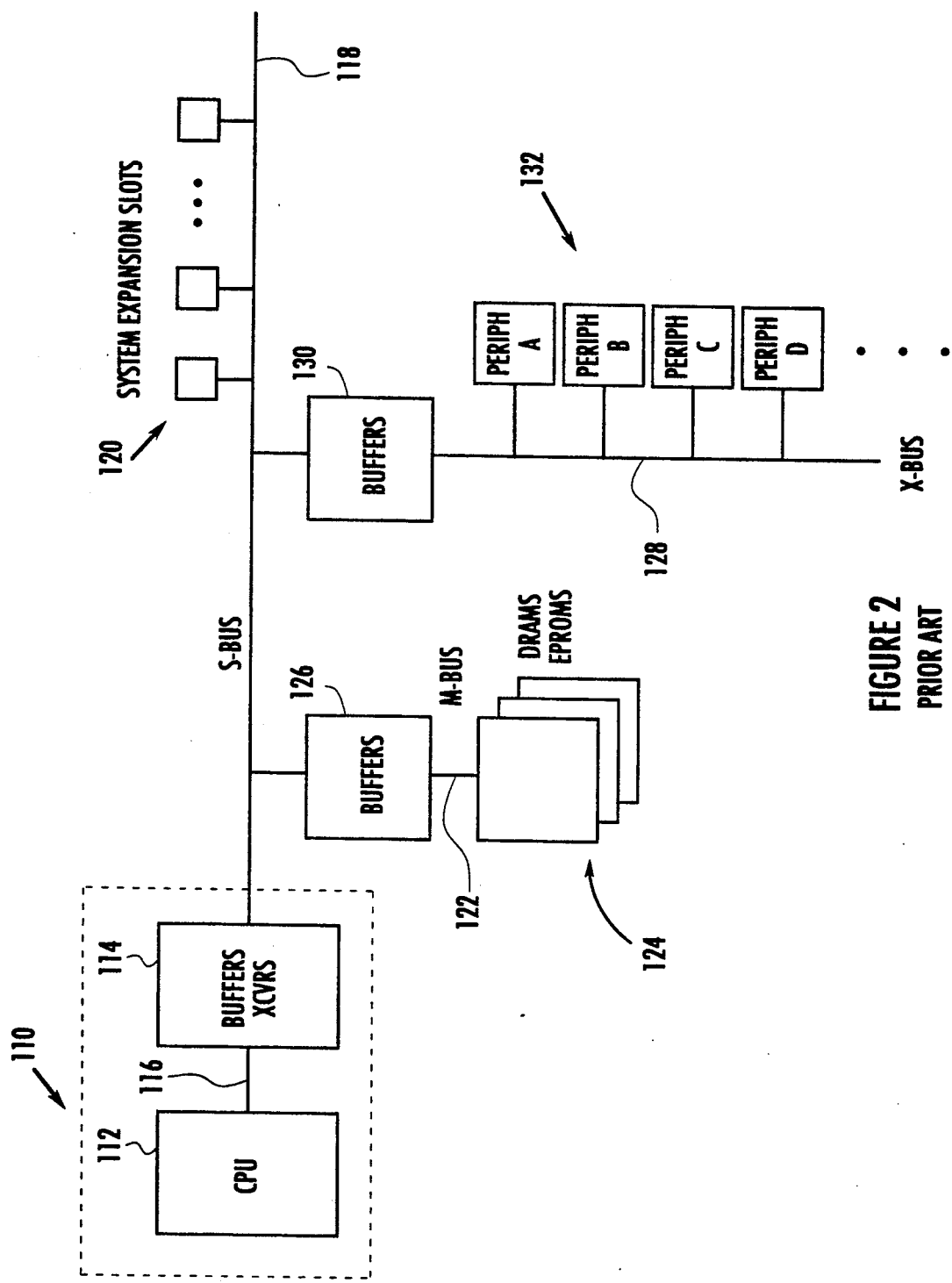
FIG. 2 is a schematic diagram of a typical prior art bus-central data bus array.

FIG. 2 is a schematic diagram of a typical prior art bus-central data bus array. In FIG. 2, a computer processing system 110 is illustrated comprising, for purposes of explanation of the present invention, a computer processing unit 112 and a buffer/transceiver circuit 114. Computer processing unit 112 is connected with buffer/transceiver circuit 114 by a local bus 116.

An S-bus 118 is operatively connected to buffer/transceiver circuit 114 and accommodates a plurality of system expansion slots 120. Operatively connected to S-bus 118 is an M-bus 122 accommodating a plurality of memory units 124, such as dynamic random access memories (DRAMs) and erasable programmable read-only memories (EPROMs). M-bus 122 is operatively connected with S-bus 118 through buffers 126. Also operatively connected with S-bus 118 is an X-bus 128 through buffers 130. X-bus 128 accommodates a plurality of peripherals 132:

Typically in the AT-type computer architecture, and similar architectures, the S-bus has a long board trace length which has a high capacitance and occupies a significant amount of "real estate" (i.e., board area). The long run of closely-spaced parallel bus lines also provides a conductor array susceptible to receiving electromagnetic noise as well as prone to generating electromagnetic signals. The significance of the high capacitance of the long board trace length of the S-bus is that such increased capacitance inherently establishes an RC circuit in conjunction with inherent resistance in the bus lines, thereby slowing down signal propagation. By operatively connecting M-bus 122 and X-bus 128 with S-bus 118, the board trace length of S-bus 118 is electrically included with the board trace lengths of M-bus 122 and X-bus 128 exacerbating the noise reception and electromagnetic signal generation propensity of M-bus 122 and X-bus 128.

Figure 3:
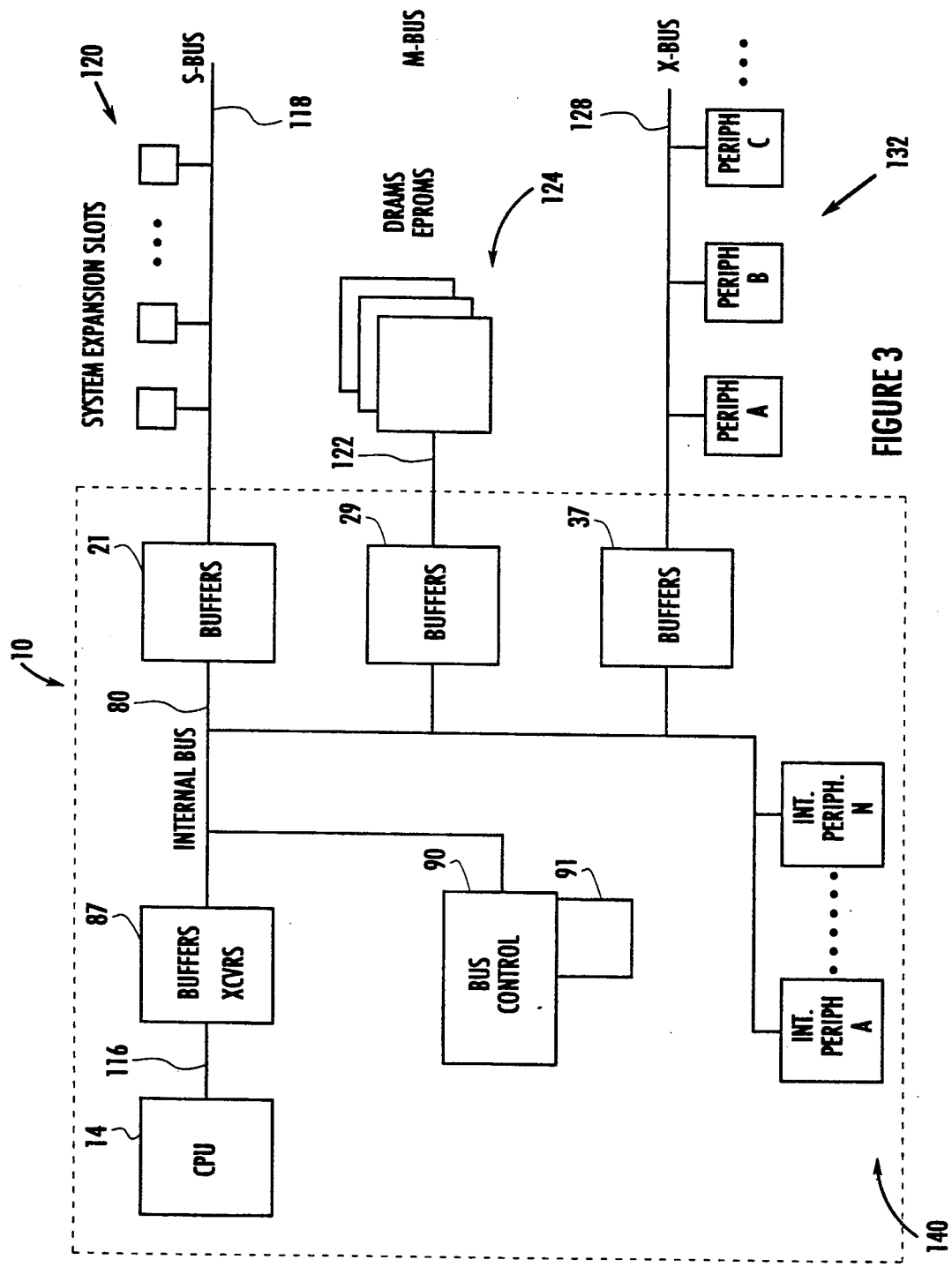
FIG. 3 is a schematic diagram of the preferred embodiment of the present invention.

FIG. 3 is a schematic diagram of the preferred embodiment of the present invention. In FIG. 3, a system 10 is illustrated, in pertinent part to illustrate the preferred embodiment of the present invention, which system 10 is of the type illustrated in FIG. 1. Accordingly, a computer processing unit 14 is connected to a buffer/transceiver circuit 87 by a local bus 116. An internal bus 80 is operatively connected to buffer/transceiver circuit 87 as well as to buffers 21, 29, 37. Buffer 21 is associated with S-bus interface 20 of FIG. 1, buffer 29 is associated with DRAM control unit 28 of FIG. 1, and buffer 37 is associated with X-bus interface circuit 36 of FIG. 1. Also operatively connected with internal bus 80 are internal peripherals 140.

Bus control 90 is operatively connected with internal bus 80. In the preferred embodiment illustrated in FIG. 3, S-bus 118 is operatively connected with internal bus 80 through buffer circuit 21, M-bus 122 is operatively connected with internal bus 80 through buffer circuit 29, and X-bus 128 is operatively connected with internal bus 80 through buffer circuit 37. Accordingly, each of the respective buses 118, 122, 128 are isolated from each other so that none of the buses 118, 122, 128 contributes to the capacitance of the other buses, and therefore none of the buses 118, 122, 128 contributes to slowing down the data propagation speed of the other buses. In such manner, the high-speed characteristics of certain peripherals 132 and certain memory units 124 may be realized to their fullest potential without the inherent speed limitations presented by the capacitance of S-bus 118.

An internal storage unit 91 is associated with bus control 90. In the preferred embodiment of the present invention, all possible routing combinations for operative interconnections which may be required by operations anticipated to be performed by system 10 are predetermined and stored in information storage unit 91. In such manner, data buses 118, 122, 128 can be routed directly to their respective buffers 21, 29, 37 and, thence, to internal bus 80 for routing under control of bus control 90. Bus control 90 effects such routing according to predetermined routing information stored in information storage unit 91.

It is to be understood that, while the detailed drawings and specific examples given describe preferred embodiments of the invention, they are for the purpose of illustration only, that the system of the invention is not limited to the precise details and conditions disclosed and that various changes may be made therein without departing from the spirit of the invention which is defined by the following claims:

What is claimed is:

1. A system for providing communications among a computer processing unit and a plurality of peripheral devices, said plurality of peripheral devices being arrayed in operative connection with a plurality of external buses; each respective peripheral device of said plurality of peripheral devices being uniquely identified by an address contained in address information; the system comprising:

a bus control means operatively connected with said computer processing unit and cooperating with said computer processing unit for effecting operative routing of selected address information of said address information identified by said computer processing unit regarding a particular said address identifying a particular peripheral device of said plurality of peripheral devices from said computer processing unit to an appropriate external bus of said plurality of external buses, said particular peripheral device being in said operative connection with said appropriate external bus, said bus control means routing data information intermediate said particular peripheral device and another of said plurality of peripheral devices or said computer processing unit via an internal bus in response to said selected address information identified by said computer processing unit; and a plurality of buffer means for establishing an operative interface between said computer processing unit and each of said plurality of external buses, said plurality of buffer means cooperating to substantially capacitively isolate each respective external bus of said plurality of external buses from other external buses of said plurality of external buses than said respective external bus;

said internal bus being operatively connected to provide communication paths among said plurality of buffer means, said bus control means, and said computer processing unit;

said bus control means including an information storage means for retaining stored routing information, said stored routing information representing each correspondence between each said particular peripheral deice and a particular buffer means of said plurality of buffer means, said bus control means effecting said routing of data information using selected routing information, said selected routing information being selected from said stored routing information in response to said selected address information.

2. A system for providing communications among a computer processing unit and a plurality of peripheral devices as recited in claim 1 wherein said bus control means, said internal bus, said computer processing unit, and said plurality of buffer means are configured as an integrated circuit on a single substrate and wherein the system further comprises a plurality of additional on-board peripheral devices, said plurality of on-board peripheral devices being integrated within the system and operatively connected with said internal bus means, each of said plurality of additional on-board peripheral devices having an address and being accessed for communications.

3. A system for providing communications between a computing apparatus and a plurality of peripheral devices located externally of said computing apparatus, said plurality of peripheral devices being arrayed in operative connection with a plurality of external buses; said computer apparatus including a computer processing unit; said computer processing unit and each respective peripheral device of said plurality of peripheral devices being uniquely identified by an address; the system comprising:

a plurality of buffer means for establishing an interface between said computing apparatus and said plurality of external buses, there at least being one respective buffer means of said plurality of buffer means for each respective external bus of said plurality of external buses, said plurality of buffer means cooperating to substantially capacitively isolate each respective external bus of said plurality of external buses from other external buses of said plurality of external buses than said respective external bus;

an internal bus means for providing communication path routing within the system, said internal bus means operatively connecting said plurality of buffer means with said computer processing unit; and a bus control means for controlling routing of data among said computer processing unit and said plurality of peripheral devices; said bus control means being operatively connected with said internal bus means and said computer processing unit; said bus control means including an information storage means for retaining stored routing information representing selected correspondence between each said respective peripheral device with said at least one respective buffer means, said bus control means responding to signals received from said computer processing unit to select specified routing information from said stored routing information for establishing communication path routing required by said signals.

4. A system for providing communications among a computer processing unit and a plurality of peripheral devices, said plurality of peripheral devices being arrayed in operative connection with a plurality of external buses; each respective peripheral device of said plurality of peripheral devices being uniquely identified by an address contained in address information; the system comprising:

a bus control means operatively connected with said computer processing unit and cooperating with said computer processing unit for effecting operative routing of selected address information of said address information identified by said computer processing unit regarding a particular said address identifying a particular peripheral device of said plurality of peripheral devices from said computer processing unit to an appropriate external bus of said plurality of external buses, said particular peripheral device being in said operative connection with said appropriate external bus, said bus control means routing data information intermediate said particular peripheral device and another of said plurality of peripheral devices or said computer processing unit via an internal bus in response to said selected address information identified by said computer processing unit; and a plurality of buffer means for establishing an operative interface between said computer processing unit and each of said plurality of external buses;

said internal bus being operatively connected to provide communication paths among said plurality of buffer means, said bus control means, and said computer processing unit;

said bus control means including an information storage means for retaining stored routing information, said stored routing information representing each correspondence between each said particular peripheral device and a particular buffer means of said plurality of buffer means, said bus control means effecting said routing of data information using selected routing information, said selected routing information being selected from said stored routing information in response to said selected address information.

5. A system for controlling communications among a computer processing unit and a plurality of peripheral devices as recited in claim 4 wherein the system further comprises a plurality of on-board peripheral devices, said plurality of on-board peripheral devices being integrated within the system and operatively connected with said internal bus means, each of said plurality of on-board peripheral devices having an address.

6. A system for providing communications between a computing apparatus and a plurality of peripheral devices located externally of said computing apparatus, said plurality of peripheral devices being arrayed in operative connection with a plurality of external buses; said computing apparatus including a computer processing unit; said computer processing unit and each respective peripheral device of said plurality of peripheral devices being uniquely identified by an address; the system comprising:

a plurality of buffer means for establishing an interface between said computing apparatus and said plurality of external buses, there at least being one respective buffer means of said plurality of buffer means for each respective external bus of said plurality of external buses;

an internal bus means for providing communication path routing within the system, said internal bus means operatively connecting said plurality of buffer means with said computer processing unit; and a bus control means for controlling routing of data among said computer processing unit and said plurality of peripheral devices; said bus control means being operatively connected with said internal bus means and said computer processing unit; said bus control means including an information storage means for retaining stored routing information representing selected correspondences between each said respective peripheral device with said at least one respective buffer means, said bus control means responding to signals received from said computer processing unit to select specified routing information from said stored routing information for establishing communication path routing required by said signals.

* * * * *